United States Patent
Stähler

(10) Patent No.: US 7,172,690 B2
(45) Date of Patent: Feb. 6, 2007

(54) DEVICE FOR PURIFYING WASTE WATER, ACCORDING TO THE ACTIVATED SLUDGE PROCESS

(76) Inventor: Theo Stähler, Mühlenhof, 65589 Hadamar-Niederzeuzheim (DE)

(*) Notice: Subject to any disclaimer, the term of this patent is extended or adjusted under 35 U.S.C. 154(b) by 49 days.

(21) Appl. No.: 10/503,404

(22) PCT Filed: Jan. 24, 2003

(86) PCT No.: PCT/EP03/00730

§ 371 (c)(1),
(2), (4) Date: Dec. 13, 2004

(87) PCT Pub. No.: WO03/064328

PCT Pub. Date: Aug. 7, 2003

(65) Prior Publication Data

US 2005/0092678 A1    May 5, 2005

(30) Foreign Application Priority Data

Feb. 1, 2002    (EP) .................................. 02002435

(51) Int. Cl.
C02F 3/00    (2006.01)

(52) U.S. Cl. ...................................... 210/151; 210/220

(58) Field of Classification Search ................ 210/150, 210/151, 220
See application file for complete search history.

(56) References Cited

U.S. PATENT DOCUMENTS 5,254,253 A    10/1993    Behmann
6,039,873 A *   3/2000    Stahler ....................... 210/605

FOREIGN PATENT DOCUMENTS

| DE | 2544177      | 4/1977  |
|----|--------------|---------|
| DE | 233818       | 3/1986  |
| EP | 0076977      | 4/1983  |
| EP | 1156015      | 11/2001 |
| JP | 09253456 A * | 9/1997  |

* cited by examiner

Primary Examiner—Chester T. Barry
(74) Attorney, Agent, or Firm—Price, Heneveld, Cooper, DeWitt & Litton, LLP

(57) ABSTRACT

The invention proposes a device for purifying waste water using a biological reactor (1, 4) for aerobic biological purification of waste water by the combined submerged contact aerator-activated sludge process. This device, following the biological reactor, is provided with a membrane filtration element (5).

The combination of this biological reactor with a membrane unit produces a low-energy system for the production of epidemiologically safe water from biologically treated waste water.

9 Claims, 3 Drawing Sheets

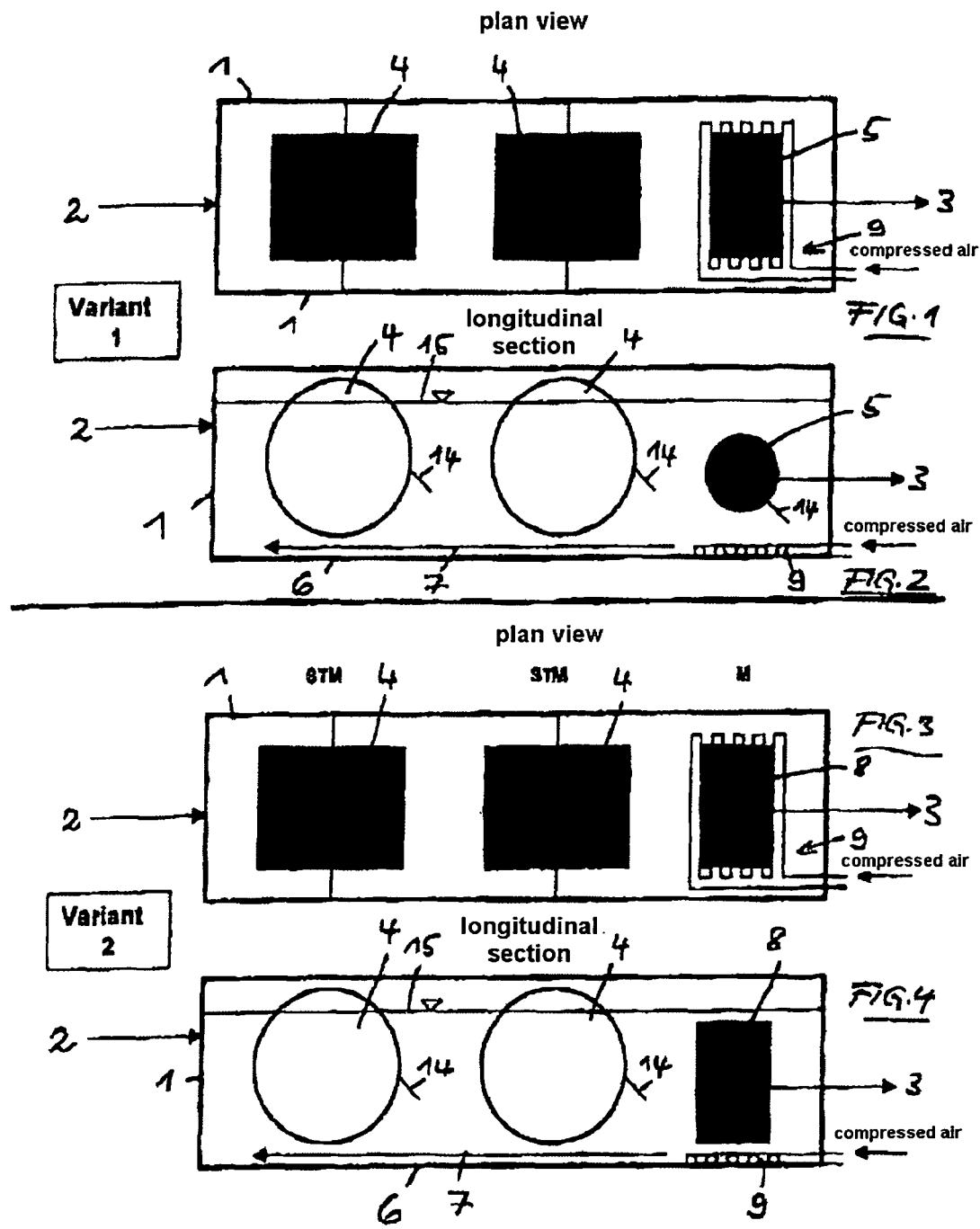

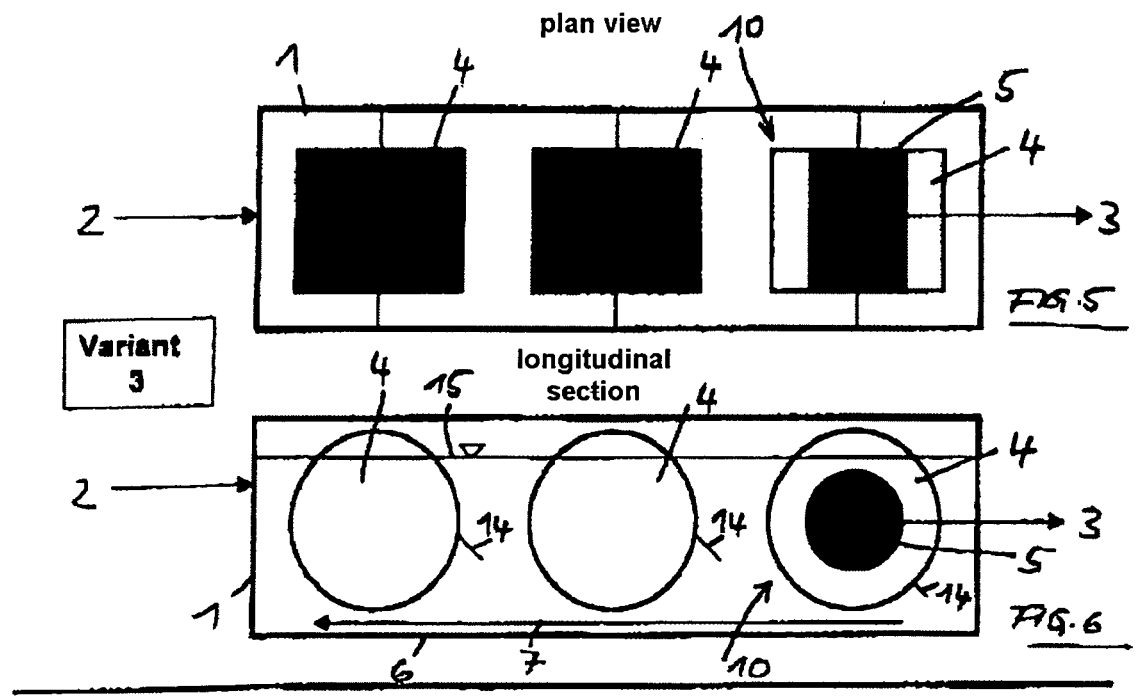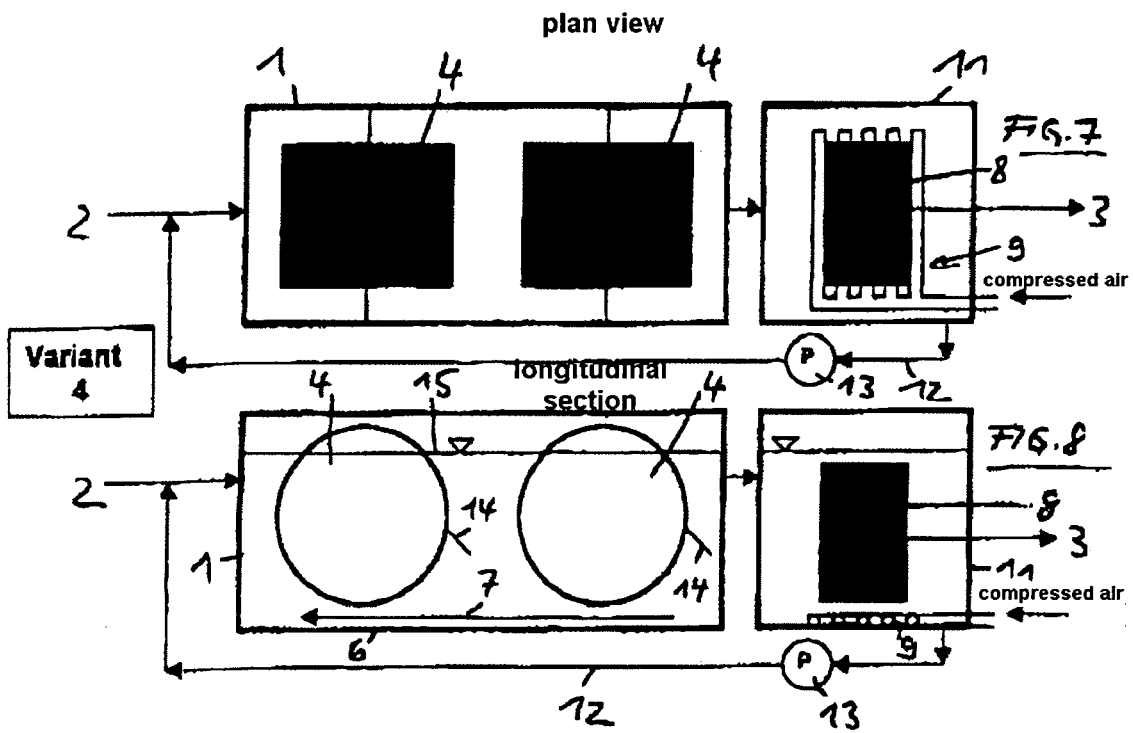

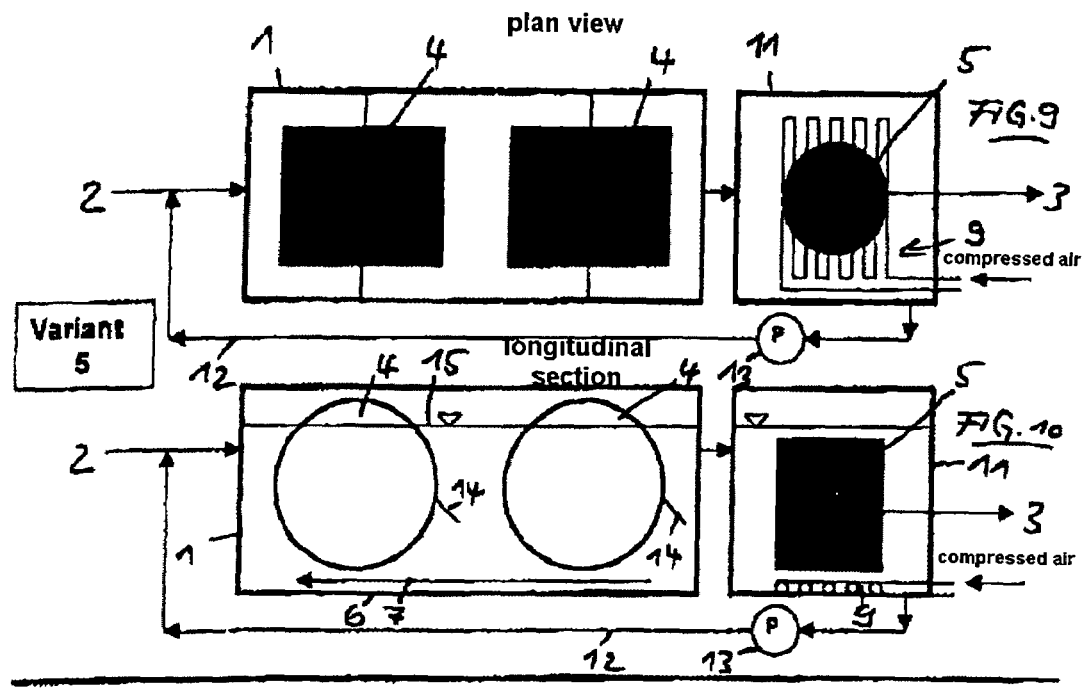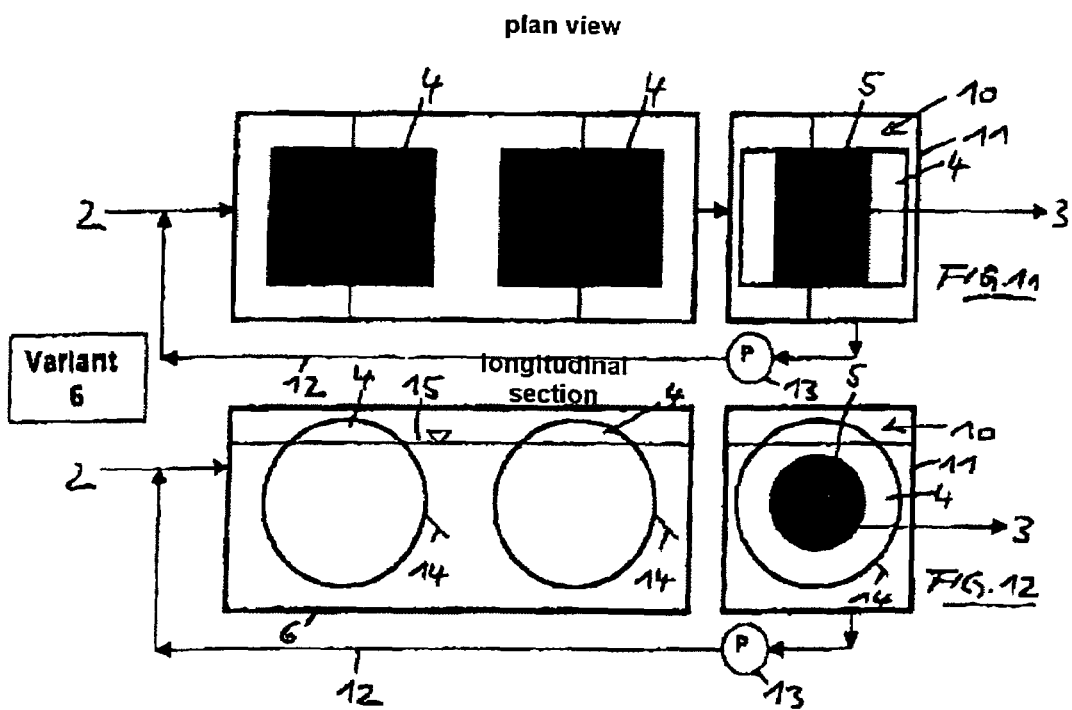

DEVICE FOR PURIFYING WASTE WATER, ACCORDING TO THE ACTIVATED SLUDGE PROCESS

The invention relates to a device for purifying waste water using a biological reactor for the aerobic biological purification of waste water using the combined submerged contact aerator-activated sludge process.

Worldwide, there is still a great requirement for sewage treatment plants, both in cities and also in the country. In the latter case, in future greater importance than hitherto will be assigned to decentralized waste water treatment.

In particular in arid and semiarid areas, there is a very great demand for using purified waste water as irrigation water in agriculture. Since waste water is always polluted with microorganisms and is thus of concern in terms of prevention of epidemics, when purified waste water is used for irrigation, there is a demand for freedom from microorganisms, particularly when sensitive fruits are irrigated which are consumed unprocessed (for example strawberries, salad). This applies also to irrigation of grass areas which are entered by people, for example grass areas at hotels and golf courses, car parks, sports places.

If treated waste water is used for irrigation, the time point of irrigation and the nutrients in the water play a decisive part:

In the case of irrigation during the vegetation period, generally in summer, the nutrients nitrogen and phosphorus must largely remain in the waste water in order to be available to the plants. This means that in terms of waste water technology, the organic carbon compounds are to be substantially degraded, but the processes of nitrification/denitrification and of biological P elimination are to be suppressed.

In the case of irrigation outside the vegetation period, generally in winter, the nutrients must be substantially eliminated, since the plants do not require nutrients and the nutrients in some circumstances penetrate into the groundwater or other surface waters and pollute these. In terms of waste water technology this means that the organic carbon compounds are to be substantially degraded and, in addition, the processes of nitrification/denitrification and of biological P elimination must proceed extensively.

Hitherto, to achieve freedom from microorganisms, chlorination or a UV unit have been used. By this means, freedom from microorganisms is achieved only temporarily. Renewed microbial contamination can occur at any time, since the organic mass is only killed, but is not removed. The dead organic mass forms a dietary basis for new microorganisms.

Purifying waste waters using a biological reactor for aerobic biological purification of waste water by the combined submerged contact aerator-activated sludge process is adequately known from the prior art. Reference is made, for example, to DE 25 44 177 C2, EP 0 017 064 B1, EP 0 076 977 B1 and EP 0 881 990 B1.

In the combined submerged contact aerator-activated sludge process, there is a targeted introduction of air into the waste water and as a result optimum oxygen supply/utilization owing to the particular structural arrangement of the submerged contact aerators which are constructed as a tube wheel (see, for example, DE 25 44 177 C2, FIG. 2) or bucket wheel (see, for example, EP 0 076 977 B1).

Advantages of bucket wheel and tube wheel are described, for example, in the product information "STM Stählermatic/Das Belüftungssystem mit den besonderen Vorteilen—Stählermatic: Das weitergehende Verfahren zur Abwasserreinigung" [STM Stählermatic/The aeration system with special advantages—Stählermatic: the extensive process for waste water purification] from Stähler GmbH, Mühlenhof, D-65689 Hadamar. The bucket wheel submerged contact aerator described in detail there consists of a multiplicity of profiled polypropylene plates. This shaping gives the submerged contact aerator its characteristic properties. A multiplicity of chambers are formed which, in the course of rotation of the submerged contact aerator, fill with air and then release the oxygen in a metered manner to the surrounding activated sludge mixed liquor and the biofilm on the submerged contact aerator surfaces. The ascending air, on its path, must pass through further segments of the bucket wheel, thus prolonging its residence time and optimizing the oxygen utilization. The speed of rotation of the submerged contact aerator can be controlled steplessly. In this manner, the oxygen input into the system is controlled and the degradation and conversion phase in the biotank is influenced. The preconditions for simultaneous denitrification and simultaneously increased biological P elimination are provided.

It is an object of the present invention to develop further a device of the type mentioned at the outset in such a manner that a low-energy system for producing epidemiologically safe water is produced from biologically treated waste water.

The object is achieved in a device of the type mentioned at the outset by means of the fact that it has, following the biological reactor, a membrane filtration element.

The invention thus proposes a combination of purifying waste water by the combined submerged contact aerator-activated sludge process with a membrane filtration element. The latter removes the organic mass. The food chain for new microorganisms is thus broken, and reinfection cannot occur.

The membrane module now used downstream of the biological reactor replaces previous conventional secondary sedimentation tanks.

Membrane filtration elements as such are known from the prior art. They have, for example, support disks with membrane plates arranged between these, and the filtered liquid is taken off by means of a suction pump.

The membrane filtration element is designed, in particular, as an ultrafiltration unit. By this means, particularly high purity values of the water separated off from the biomass may be achieved.

The combination of the submerged contact aerator-activated sludge system with a membrane module gives a low-energy system for the production of epidemiologically safe water from biologically treated waste water with the particular advantages of the submerged contact aerator-activated sludge system coming to effect:

In winter a conventional activated sludge system has problems with nitrification, since this proceeds with limitation at low temperatures. A submerged contact aerator-activated sludge system operates in a virtually temperature-independent manner and achieves high nitrification performance even at low water temperatures.

In order, in summer, to retard or stop the nitrification, the oxygen feed must be throttled by reducing the rotations.

An activated sludge system comes here to the limits of performance, since when the air feed is restricted, the turbulence is also restricted and sludge deposition occurs. The consequences are deposits or rotting processes which lead to redissolution and cause secondary fouling. With the submerged contact aerator-activated sludge system, the speed of rotation of the wheels can be throttled to at least 10% of the possible speed of rotation. Thus, adaptation to the required oxygen demand for oxidation of the organic carbon compounds is possible at any time. Throttling the oxygen feed impedes the nitrification and the nitrogen content in the waste water is substantially retained. At the same time, via the mixing action of the rotating wheels, enough turbulence is still produced to prevent settling and thus rotting of the sludge. Experience up to activated sludge concentrations of greater than 12 kg/m³ is available.

Developments of the inventive device relate to the arrangement of the membrane filtration element. This can be designed, for example, to be stationary with additional compressed air aeration, or else so as to rotate, with or without additional compressed air aeration. The membrane filtration element can be installed in the tank in which the submerged contact aerator or aerators are arranged. It is equally conceivable to provide a separate tank for the membrane filtration element. Since, in the separate module tank, the activated sludge is concentrated, return sludge transport must be arranged, for example via a return sludge pump. This ensures that the upstream biotank which accommodates the submerged contact aerators has a sufficient activated sludge concentration.

A particular embodiment of the invention provides that the submerged contact aerator serves for accommodation, in particular integration, of the membrane filtration element. This increases the oxygen feed in the tank and achieves enhanced cleaning performance of the rotating membrane module. Additional compressed air aeration is not necessary in this case. It is considered particularly advantageous if the submerged contact aerator is constructed as a tube wheel, the interior of which is filled by the membrane filtration element.

In a combination of submerged contact aerator and membrane filtration element, by means of the rotary movement of the submerged contact aerator membrane module and of the other submerged contact aerators arranged in the tank, at the tank base a bottom flow is produced which transports the activated sludge back to the feed area. Return sludge transport is not necessary.

Hereinafter, advantageous variants of the inventive device are described. All variants can be operated without and with preliminary purification of the waste water. The preliminary purification can be performed, for example, by a screen unit or coarse desludging.

BRIEF DESCRIPTION OF THE DRAWINGS

FIG. 1 illustrates a schematic plan view of a first variant of a device for purifying waste water of the present invention.

FIG. 2 illustrates a schematic longitudinal section of the first variant of the device for purifying waste water of the present invention.

FIG. 3 illustrates a schematic plan view of a second variant of the device for purifying waste water of the present invention.

FIG. 4 illustrates a schematic longitudinal section of the second variant of the device for purifying waste water of the present invention.

FIG. 5 illustrates a schematic plan view of a third variant of the device for purifying waste water of the present invention.

FIG. 6 illustrates a schematic longitudinal section of the third variant of the device for purifying waste water of the present invention.

FIG. 7 illustrates a schematic plan view of a fourth variant of the device for purifying waste water of the present invention.

FIG. 8 illustrates a schematic longitudinal section of the fourth variant of the device for purifying waste water of the present invention.

FIG. 9 illustrates a schematic plan view of a fifth variant of the device for purifying waste water of the present invention.

FIG. 10 illustrates a schematic longitudinal section of the fifth variant of the device for purifying waste water of the present invention.

FIG. 11 illustrates a schematic plan view of a sixth variant of the device for purifying waste water of the present invention.

FIG. 12 illustrates a schematic longitudinal section of the sixth variant of the device for purifying waste water of the present invention.

For the variant 1 shown, FIG. 1 illustrates a plan view, and FIG. 2 a longitudinal section of the inventive device.

An activation tank 1 is provided in the region of an end with a feed 2 for prescreened pipe waste water and in the region of the opposite end with an outlet 3 for purified epidemiologically safe water. One or more submerged contact aerators 4 (tube wheel or bucket wheel) are installed in the activation tank 1. In the same tank 1 there is at least one rotating membrane module 5. The oxygen supply for the biology is produced by the submerged contact aerators 4. Owing to the turbulence in the tank 2 and the rotary motion of the membrane module 5, additional pressure aeration for cleaning the module 5 is not required. Additional pressure aeration can be installed.

The rotary motion of the submerged contact aerators 4 and the module 5 produces a bottom flow 7 at the base of the tank 6, which flow transports the activated sludge back to the feed area. Return sludge transport is not necessary.

The submerged contact aerators 4 and the module 5 are provided at the periphery with paddles 14 to increase the flow through the tank 1, the water level of which is designated with the reference number 15.

The further variants 2 to 6 show plan views in FIGS. 3, 5, 7, 9 and 11 and longitudinal sections in FIGS. 4, 6, 8, 10, 12 of the respective devices in a depiction corresponding to variant 1. Components which correspond with respect to structure or mode of action of those of variant 1 are designated with the same reference numbers for the sake of simplicity.

In the case of variant 2 illustrated in FIGS. 3 and 4, one or more submerged contact aerators 4 (tube wheel or bucket wheel) are installed in the activation tank 6. In the same tank 6 there is at least one stationary membrane module 8. The oxygen supply for the biology is provided by the submerged contact aerators 4. Compressed air aeration 9 is always necessary to clean the fixed module 8, since no other shear forces occur as is the case with a rotating module 5.

The rotary motion of the submerged contact aerators 4 produces a bottom flow 7 at the base of the tank 6, which bottom flow transports the activated sludge back to the feed area. Return sludge transport is not necessary.

In the case of variant 3 shown in FIGS. 5 and 6, one or more submerged contact aerators 4 (tube wheel or bucket wheel) are installed in the activation tank 1. The oxygen supply for the biology is provided by the submerged contact aerators 4. In the same tank 1 there is at least one rotating membrane module 5.

To increase the oxygen feed in tank 1 and to achieve enhanced cleaning performance of the rotating membrane module 5, at least one submerged contact aerator 4, which is constructed as a tube wheel, is used, the interior of which is filled by the rotating membrane module 5. Additional compressed air aeration 9 is not necessary in this case.

The rotary motion of the submerged contact aerators 4 and the unit 10 formed by the submerged contact aerator 4 and the membrane module 5 produces a bottom flow 7 at the base of the tank 6, which bottom flow transports the activated sludge back to the feed area. Return sludge transport is not necessary.

In the variant 4 illustrated in FIGS. 7 and 8, one or more submerged contact aerators 4 (tube wheel or bucket wheel) are installed in the activation tank 1. In a separate tank 11 there is at least one stationary membrane module 8. The oxygen supply for the biology is provided by the submerged contact aerators 4. An additional compressed aeration 9 is necessary to clean the stationary module 8 in the tank 11 which stands separately. For the oxygen demand for the biology, this required compressed air with its additional oxygen feed is taken into account.

Since, in the separate module tank 11, the activated sludge is concentrated, return sludge transport 12 must be arranged, for example via a return sludge pump 13, so that the upstream biotank 1 has a sufficient activated sludge concentration.

The variant 5 shown in FIGS. 9 and 10 corresponds to variant 4, but with a rotating membrane module 5.

The variant 6 shown in FIGS. 11 and 12 corresponds to variant 4, but with a submerged contact aerator 4 in the form of a tube wheel with integrated membrane module 5. There is no compressed air aeration 9.

The invention claimed is:

1. A device for purifying waste water comprising:
   a biological reactor for aerobic biological purification of the waste water by a combined submerged contact aerator-activated sludge process, the biological reactor including at least one submerged contact aerator; and
   a membrane filtration element following the biological reactor;
   wherein the membrane filtration element is integrated into at least one of the submerged contact aerators; and
   wherein the at least one submerged contact aerator is constructed as a tube wheel.

2. The device as claimed in claim 1, wherein:
   the membrane filtration element is constructed as an ultrafiltration element.

3. The device as claimed in claim 1, wherein:
   the membrane filtration element is constructed to be stationary, with additional compressed air aeration.

4. The device as claimed in claim 1, wherein:
   the membrane filtration element is constructed so as to rotate, with or without additional compressed air aeration.

5. The device as claimed in claim 1, wherein:
   the biological reactor comprises at least one tank in which one or more submerged contact aerators are installed.

6. The device as claimed in claim 5, wherein:
   the membrane filtration element is installed in the tank or tanks which accommodate the submerged contact aerators.

7. The device as claimed in claim 5, wherein:
   the tank accommodates the submerged contact aerator or aerators; and
   further including a further tank which accommodates the membrane filtration element.

8. The device as claimed in claim 7, further including:
   a transport device which transports the activated sludge from the tank accommodating the membrane filtration element into the tank accommodating the submerged contact aerator or aerators.

9. The device as claimed in claim 8, wherein:
   the submerged contact aerator is constructed as a tube wheel having an interior; and
   the membrane filtration element rotates, the membrane filtration element filling the interior of the tube wheel.

* * * * *